United States Patent
Grier et al.

(10) Patent No.: US 6,871,344 B2
(45) Date of Patent: Mar. 22, 2005

(54) CONFIGURATIONS FOR BINDING SOFTWARE ASSEMBLIES TO APPLICATION PROGRAMS

(75) Inventors: Michael J. Grier, Woodinville, WA (US); Sanjay G. Shenoy, Redmond, WA (US); RoseMarie FitzSimons, Seattle, WA (US); David D'Souza, Mercer Island, WA (US); Srivatsan Parthasarathy, Bellevue, WA (US); Micheal Dunn, Redmond, WA (US); Alan Shi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 09/842,278

(22) Filed: Apr. 24, 2001

(65) Prior Publication Data

US 2002/0100017 A1 Jul. 25, 2002

Related U.S. Application Data

(60) Provisional application No. 60/199,227, filed on Apr. 24, 2000.

(51) Int. Cl.$^7$ ................................................. G06F 9/45
(52) U.S. Cl. ....................................................... 717/162
(58) Field of Search ................................ 717/162–178, 717/151–153; 707/203; 719/331, 332

(56) References Cited

U.S. PATENT DOCUMENTS

| | | | | |
|---|---|---|---|---|
| 4,809,170 A | * | 2/1989 | Leblang et al. | 717/122 |
| 5,339,430 A | * | 8/1994 | Lundin et al. | 709/332 |
| 5,805,899 A | * | 9/1998 | Evans et al. | 717/170 |
| 5,974,470 A | | 10/1999 | Hammond | 719/331 |
| 6,185,734 B1 | * | 2/2001 | Saboff et al. | 717/164 |
| 6,314,565 B1 | * | 11/2001 | Kenner et al. | 717/171 |
| 6,560,614 B1 | * | 5/2003 | Barboy et al. | 707/201 |
| 6,658,659 B2 | | 12/2003 | Hiller et al. | 717/170 |

OTHER PUBLICATIONS

Hicks et al. Dynamic Software Updating. ACM. 2001. pp. 13–23.*
Finnie, Scot et al., "The Final Beta—Inside Windows 2000 Beta 3", www.PlanetIT.com/docs/PIT19990707S0023, Jul. 1, 1999, pp. 1–8.
Grinzo, Lou, "Paranoia is Your Friend", www.winmag.com/library/1997/0601/analy034.htm, Jun. 1997, pp. 1–3.
Richardson, Robert, "Components Battling Components", www.byte.com/art/9711/sec6/art6.htm, Nov. 1997, pp. 1–12.

* cited by examiner

Primary Examiner—Wei Y. Zhen
(74) Attorney, Agent, or Firm—Microsoft Corp.

(57) ABSTRACT

A method, system and infrastructure that allow an application to run with specified versions of assemblies bound thereto, while allowing the application author, assembly publisher and/or an administrator to change the originally-specified version as desired. Each assembly may exist and run side-by-side on the system with other versions of the same assembly being used by other applications. An application manifest specifies any desired assembly versions, which may be redirected to another version (overridden) by an application configuration. A publisher configuration provided by an assembly publisher can similarly override the specified version. Lastly, an administrator configuration is capable of overriding other configuration versioning information. A table built from the manifest and any configuration redirection may be accessed during execution to quickly locate the appropriate version. The various configuration data structures themselves may be wrapped as assemblies, thereby enabling versioning of configurations.

9 Claims, 14 Drawing Sheets

CONFIGURATIONS FOR BINDING SOFTWARE ASSEMBLIES TO APPLICATION PROGRAMS

CROSS-REFERENCE TO RELATED APPLICATIONS

The present application claims priority to U.S. Provisional Patent Application Ser. No. 60/199,227, filed Apr. 24, 2000, and is also related to copending United States Patent Application entitled *"Isolating Assembly Versions for Binding to Application Programs"* filed concurrently herewith.

FIELD OF THE INVENTION

The present invention is generally directed to computer systems, and more particularly to executable computer code such as application programs that utilize shared assemblies.

BACKGROUND OF THE INVENTION

At one time, computer applications were monolithic blocks of executable code and data, although some of their data such as variable settings could be maintained in separate files. This made tasks like moving or replacing the application simple. In contrast, contemporary computer applications and other executable code (such as an operating system component) bind to and make use of shared components, wherein in general a component is a self-contained software entity, offering a set of functions that can be used by a variety of applications. Such components include dynamic link libraries (DLLs) and objects such as OLE (Object Linking and Embedding) components and COM (Component Object Model) components, including ActiveX® controls. In turn, some of these shared components depend on other shared components.

On any given machine, at present there is one version of each of these components shared by applications, such as the most-recently installed version, although some mechanisms are known that replace an installed component only when an available replacement component has a higher version number. The metadata maintained for using these components is generally maintained in the system registry, and the application has the names of the needed components compiled into its binary code. Because in general the application does not change as components change, to function properly, global component sharing requires that any shared component function exactly like previous other versions of that component with respect to what an application expects. In practice, however, perfect backwards compatibility is difficult if not impossible to achieve, among other reasons because it is impractical to test the many configurations in which the shared component may be used. For example, both newer and older applications end up sharing the same component, whereby over time, fixing and improving the component becomes increasingly difficult. Moreover, the practical functionality of a component is not easily defined. For example, some applications may utilize unintended side effects in a component that are not considered part of the core function of the component, e.g., an application may become dependent on a bug in a component, and when the component publisher chooses to fix that bug, the application fails. Of course, on the other side, application writers cannot test future versions of components.

As a result, problems occur when a component is updated to its newer version, such as when a new application or operating system service pack is installed with updated copies of components, as the newly installed component versions become the ones used by other applications and components on the system. The sheer volume of applications and components that rely on other components magnifies this problem, which is sometimes referred to as "DLL Hell."

One mechanism that provided sharing for some applications while enhancing the stability of other applications was provided in Microsoft Corporation's Windows® 2000 and Windows® 98, Second Edition, operating systems. In general, this mechanism provided a way for an application to be bound to a local copy of a component instead of a shared copy. However, with this solution, a component needed to be isolated per application, which resulted in multiple copies of the same component version having to be maintained on the system. Additionally COM data was not isolated, limiting this mechanism's usefulness with COM objects.

At the same time, even if it was possible to permanently bind an application to one version of a shared component, it is not always desirable to do so. For example, a critical security fix may be made to a component, but if an existing application were permanently bound to an earlier version of that component, the application would not be protected by the security fix. In sum, the existing models for sharing components have many problems and shortcomings.

SUMMARY OF THE INVENTION

Briefly, the present invention provides a method, system and infrastructure that allow an application to run with specified versions of components bound thereto, while allowing the application author and/or component publisher to change the version as desired. In an alternative mode, an administrator may also have input (e.g., the final decision) as to specifying the version to be used. A component is often packaged with other components as an assembly, wherein an assembly is set of one or more component files that are versioned and ship as a unit, and thus as used herein a set of one or more components are also referred to as an assembly, and a component publisher an assembly publisher.

Each assembly may exist and run side-by-side on the system with other versions of the same assembly being used by other applications. To this end, the application provides an application manifest to specify any desired assembly versions. The application author may also provide (e.g., at a later time) an application configuration that overrides the binding information in the application manifest. The present invention also allows an assembly publisher to provide a publisher configuration that may similarly control which assembly version will be used. In a first alternative mode, the application configuration (when present) is applied after any publisher configuration is applied and thus overrides the publisher configuration's binding information. In a second alternative mode, the order of applying the configurations is reversed, whereby the publisher configuration may change the application configuration's binding override information. In this second alternative mode, the application configuration may have a setting therein that bypasses the publisher configuration, in a "safe" mode of operation. Lastly, (preferably also in this second alternative mode), an administrator configuration may be present that is capable of overriding the other configuration version binding information. Some or all of the various configuration data structures (e.g., the publisher configurations) themselves may wrapped as assemblies, thereby benefiting from the characteristics of assemblies, including versioning of configurations, strong naming of configurations, and so on.

In this manner, the present invention enables applications to explicitly use different versions of assemblies from what the application as originally shipped had specified. This allows for exact management and control of assemblies during the lifecycle of the application. To determine the correct version, at runtime, in the first mode, the present invention first interprets the application manifest (e.g., released with the application), followed by a publisher configuration, if present, that may redirect (re-map) any assembly versions specified in the application manifest to other assembly versions. Then, if an application configuration is present, the application configuration is interpreted to redirect some or all of the current binding information, e.g., for the current assembly version to another assembly version, as specified therein.

In the second alternative mode, the present invention first interprets the application manifest (e.g., released with the application), followed by the application configuration, if present, that may redirect (re-map) any versions specified in the application manifest to other versions. Then, if a publisher configuration is present, and the application configuration does not bypass the publisher configuration via a special safe mode, the publisher configuration is interpreted to (possibly) redirect the current binding information, e.g., for that assembly version to another assembly version, as specified therein. Lastly, any administrator configuration is interpreted to (possibly again) change the bindings to assembly versions.

For efficiency, the present invention may build tables in an activation context in a pre-execution initialization phase to maintain the version mapping information, rather than interpreting the manifest and any configurations each time an assembly is needed, (i.e., per-request file mapping including adjusting for configurations is straightforward to implement, but less efficient). The activation context tables provide fast mapping from assembly names provided by the application, including version-independent names, to the correct versions as specified in the manifest (normally fully-named assemblies) and altered by any configurations. Once built, the tables may be cached, e.g., such as in the first alternative mode for the time that the application instance runs (lifetime of the process), whereby the information therein is available as needed. In an alternative mode such as the second alternative mode, the tables or other binding data may be dynamically recalculated.

To use the tables, in the pre-application execution phase when creating a new process, the operating system checks for an application manifest in same file system directory as the calling executable. In the first alternative mode, when an application manifest exists, the operating system checks for an activation context for the application that was built from the manifest and configurations. If the activation context does not exist (for example this is the first time application has been executed), or it exists but is not coherent with current configuration, a new activation context is created via the application manifest and configurations.

At runtime, when a program requests creation of a global object, the operating system automatically consults the activation context built from the application and configurations to locate and load the appropriate assembly version. The operating system also maps any uses of this named object to the appropriate version to allow for multiple versions of the code module to run simultaneously without interfering with each other. By the activation context built from the application manifest and the configurations, an application may be efficiently bound to specific assembly versions and thereby be isolated from assembly version changes. At the same time, changes to the bindings are enabled via the configurations.

Other objects and advantages will become apparent from the following detailed description when taken in conjunction with the drawings, in which:

DETAILED DESCRIPTION
Exemplary Operating Environment

Figure 1:
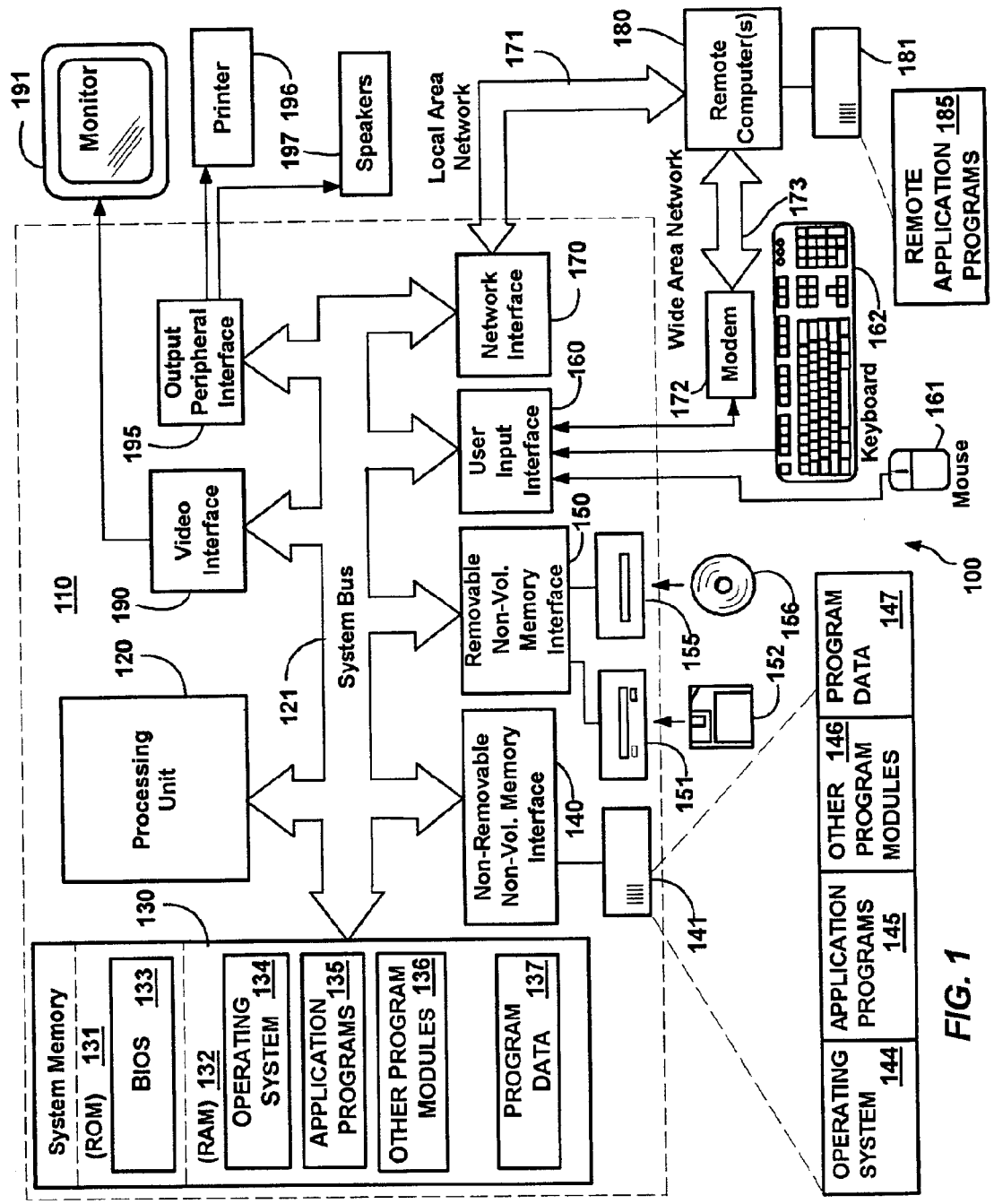
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Isolating and Binding Assembly Versions

The present invention is generally directed to binding application programs to configuration (also referred to as policy) determined, isolated versions of components, (including code and/or data), per-application program or the like, in a manner that allows multiple versions of the same component to exist and operate side-by-side on a system. For practical purposes, components are often collected into an assembly, which, when referring to items such as a component, is the lowest unit of storage packaged for activation, distribution and versioning. Rather than deal with individual components, of which there may be a relatively large number, many of the actions regarding components that are grouped together can be handled by referring to their assembly. For example, rather than list in the manifest 204 the dependencies on a large number of individual components that are packaged together in a component assembly, the manifest may simply list a dependency on the assembly. As used herein, the term "assembly" will refer to one or more components, whether referring to a single component (e.g., one contiguous DLL) or to a plurality of components grouped together.

Assemblies can be shared, such as when more than one application or the like needs an instance of the assembly's code. To provide significant flexibility while being transparent to existing and newly-developed applications, the present invention has been implemented in an operating system, with applications being run via the operating system. As will be understood, however, the present invention is not limited to applications and/or an operating system implementation, but rather is capable of being implemented by virtually any mechanism internal or external to executable code (e.g., an application) that needs or wants to use a specific version of an assembly. Note that as used herein, an application program is not limited to any particular type of software product, but includes any executable code such as operating system components, drivers and so on that in turn use other assemblies. Notwithstanding, the present invention will be primarily described with an application that uses assemblies such as DLLs and objects.

Figure 2A:
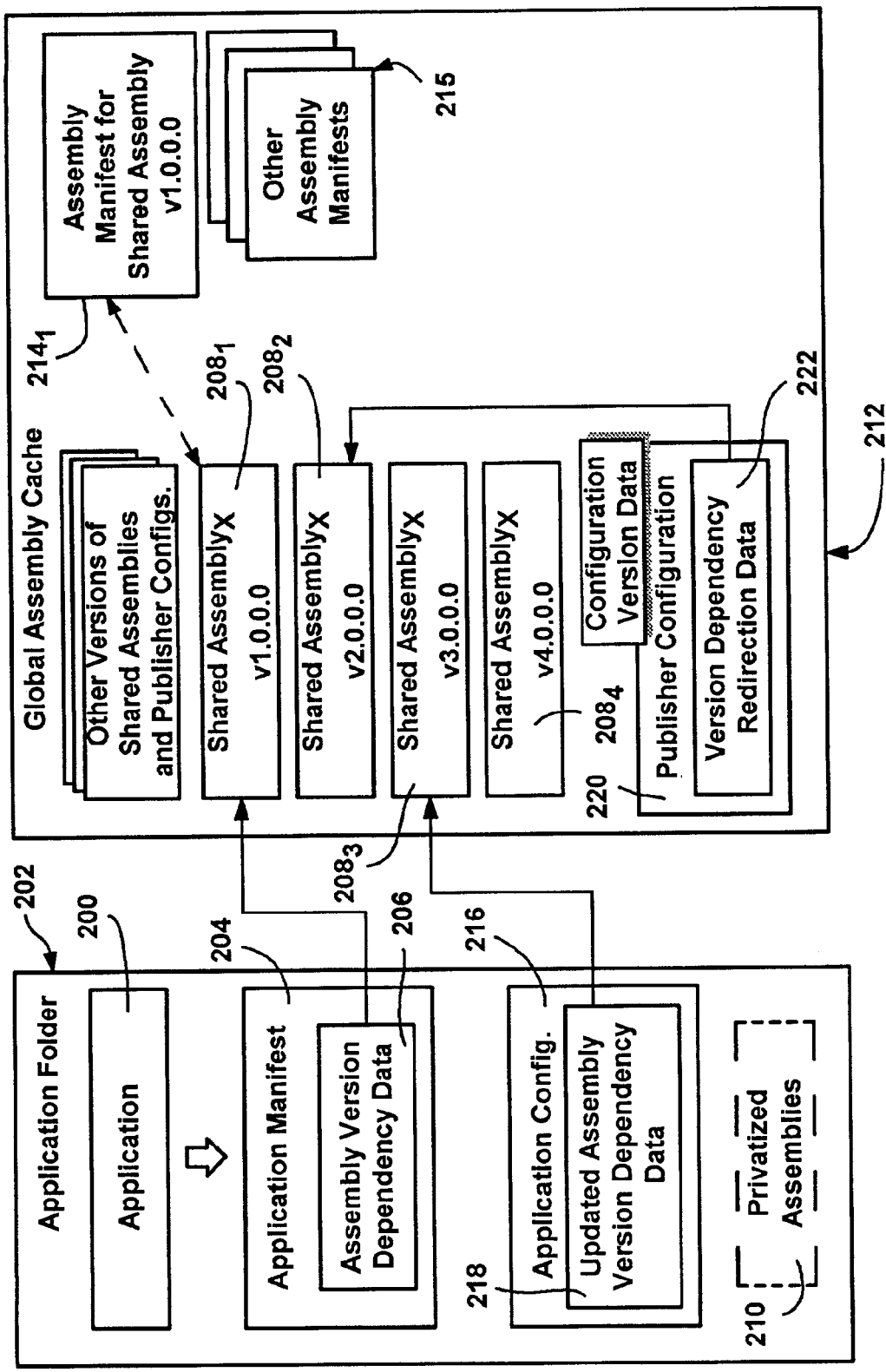
FIGS. 2A and 2B are block diagrams generally representing alternative modes, respectively, for binding applications to assemblies, including manifests and configurations that are used to specify assembly version bindings in accordance with aspects of the present invention.

FIG. 2A shows an application program 200 maintained, for example, as an executable file in a file system folder 202 in a non-volatile storage (e.g., hard disk drive 141) of the computer system 100 (FIG. 1). To identify specific versions of one or all of the specific assemblies that the application prefers to use, an application such as the application 200 of FIG. 2A is associated with an application manifest 204. For example, one way in which an application may be associated with a manifest is to store the manifest in the same folder 202 with the application executable, named with the same filenames but with different file extensions (e.g., ".exe" versus ".manifest"). Alternatively, the application manifest 204 may be compiled into the application's binary code/data, as long as it can be easily accessed. Note that other applications (typically in different folders) may or may not have application manifests associated therewith.

In general, an application manifest is an XML (extensible Markup Language) formatted file or other suitable file that comprises metadata (e.g., 206) describing an application's dependencies on shareable assembly versions, (sometimes referred to as side-by-side assemblies), and also includes metadata to describe any privatized assemblies (described below). For example, the application manifest 204 specifies in its dependency data 206 a dependency on a particular version (e.g., v1.0.0.0) of a shared assembly, assembly$_x$ 208$_1$, as represented in FIG. 2A by the arrow between blocks 206 and 208$_1$. Note that the application manifest 204 may also specify dependencies on other assemblies. Further, note that other data structures including a configuration, (described below), which are not ordinarily considered side-by-side assemblies, each may be wrapped as an assembly to thereby obtain the benefits that an assembly may have, such as versioning, naming and so forth. The wrapping of a configuration as an assembly including associated version information is generally represented in FIG. 2A by the box labeled "Configuration Version Data" accompanying the publisher configuration 220 in FIGS. 2A and 2B.

Two types of assemblies are possible, those having strong names, e.g., including a public key signature or the like such that any two different assemblies can be unambiguously identified, and those having a simple name, which may be ambiguous in the system, and, for example, do not contain a public key. To provide isolation, any simply-named assemblies on which an application manifest specifies a dependency are treated as privatized assemblies 210 of FIG. 2A, (wherein the dashed box represents that the privatized assemblies may or may not be present for a given application). Privatized assemblies are those that the application does not intend to be shared with other applications. Privatized assemblies that have simple names are normally installed into the same folder as the executable application code, whereby the assembly is isolated and the application is given the effect of being monolithic, e.g., its assemblies are not influenced by different assemblies having the same simple name, and so forth. By not being shared, privatized assemblies with simple names thus have the benefit of virtually complete isolation, at the expense of the benefits obtained by sharing. Assemblies having strong names do not need to be placed into the application folder for isolation purposes, because assemblies with strong names are known to be the exact one the application needs. Thus, instead of being privatized by storing in a certain directory, such assemblies may be placed into a global assembly cache 212 to obtain the benefits of sharing, while effectively preserving isolation, because an application that asks for a strongly named assembly will get a copy that is exact (subject to configuration overrides, as described below).

The application, manifest and assemblies, both privatized and global, are installed to their appropriate file system locations at the time the application or assembly is installed. In general, the application, application manifest and privatized assemblies (those not strongly named) are copied to the application folder, while strongly named assemblies may be copied to the global assembly cache 212 (e.g., one or more folders). Note that to provide side-by-side existence of assembly versions, any existing assembly versions are not overwritten in the assembly cache 212 when another version is installed, (although a version can be removed by other means, at the risk of breaking an application that depends on that version). The assembly cache can be hidden and/or access controlled to prevent assemblies from being easily removed. The installation and general usage of manifests and assemblies are further described in the aforementioned United States Patent Application entitled *"Isolating Assembly Versions for Binding to Application Programs."*

Example manifests in XML format are set forth in the tables below, wherein TABLE1 is an example of a simple application manifest where the application depends on a side-by-side version of COMCTL32:

TABLE 1

```
<?xml version="1.0" encoding="UTF-8" standalone="yes"?>
<assembly xmlns="urn:schemas-microsoft-com:asm.v1"
manifestVersion="1.0">
<assemblyIdentity
    version="1.0.0.0"
    processorArchitecture="X86"
    name="Microsoft.Windows.mysampleApp"
    type="win32"
/>
<description>Your app description here</description>
<dependency>
```

TABLE 1-continued

```
    <dependentAssembly>
        <assemblyIdentity
            type="win32"
            name="Microsoft.Windows.Common-Controls"
            version="6.0.0.0"
            processorArchitecture="X86"
            publicKeyToken="6595b64144ccf1df"
            language="*"
        />
    </dependentAssembly>
</dependency>
</assembly>
```

TABLE 2 is an example of an application manifest where the application depends on a side-by-side version of COMCTL32 and an assembly is privatized to the application:

TABLE 2

```
<?xml version="1.0" encoding="UTF-8" standalone="yes"?>
<assembly xmlns="urn:schemas-microsoft-com:asm.v1"
manifestVersion="1.0">
<assemblyIdentity
    version="1.0.0.0"
    processorArchitecture="X86"
    name="Microsoft.Windows.mysampleApp"
    type="win32"
/>
<description>Your app description here</description>
<dependency>
    <dependentAssembly>
        <assemblyIdentity
            type="win32"
            name="Microsoft.Windows.Common-Controls"
            version="6.0.0.0"
            processorArchitecture="X86"
            publicKeyToken="6595b64144ccf1df"
            language="*"
        />
    </dependentAssembly>
</dependency>
<!-- Privatized assembly -->
<file name="mypaint.dll">
        <comClass description="Font Property Page"
clsid="{0BE35200-8F91-11CE-9DE3-00AA004BB851}"/>
        <comClass description="Color Property Page"
clsid="{0BE35201-8F91-11CE-9DE3-00AA004BB851}"/>
        <comClass description="Picture Property Page"
clsid="{0BE35202-8F91-11CE-9DE3-00AA004BB851}"/>
</file>
<file name="mydraw.dll"/>
<file name="testctl32.dll">
        <windowClass>ToolbarWindow32</windowClass>
        <windowClass>ComboBoxEx32</windowClass>
        <windowClass>testctls_trackbar32</windowClass>
        <windowClass>testctls_updown32</windowClass>
        <windowClass>testctls_progress32</windowClass>
</file>
<file
    name="new\SxS_COM.dll">
    <comClass
        description="SxSTestObject Class"
        clsid="{F3B09421-5A10-4756-9BAF-7A447E07D3C2}"
        threadingModel="Apartment"
        tlbid="{B21101B9-90DF-4841-BEAC-41F68CD94BDC}"
        progid="SxS_COM.SxS_COMObject.1">
        <progid>"SxS_COM.SxS_COMObject"</progid>
    </comClass>
    <interface
        iid="{D8C178A3-F275-4EAB-B6F4-896B5B9A0FC0}"
        name="ISxSTestObject"
        proxystubclsid="{00020424-0000-0000-C000-
000000000046}"
```

TABLE 2-continued

```
            proxystubclsid32="{00020424-0000-0000-C000-
    000000000046}"
            tlbid="{B21101B9-90DF-4841-BEAC-41F68CD94BDC}"/>
        <typelib
            tlbid="{B21101B9-90DF-4841-BEAC-41F68CD94BDC}"
            version="1.0"
            description="SxS_COM 1.0 Type Library"
            helpdir="new"/>
    </file>
</assembly>
```

Assemblies may be dependent on other assemblies, which in turn are dependent on other assemblies, and so on. To ensure the proper versions of dependent assemblies, one or more of the assemblies (e.g., assembly $208_1$) each have an assembly manifest (e.g., $214_1$) associated therewith that specifies its corresponding assembly's dependencies. To this end, assembly authors that create a side-by-side assembly may also author an assembly manifest, which is copied to the assembly cache 212 with the corresponding assembly at the time of installation, whereby that assembly manifest will be interpreted for proper version dependencies. Note that although not directly identified in FIG. 2A, it is understood that assemblies x $208_2$–$208_4$ and any other assemblies in the assembly cache 212 each may have an assembly manifest associated therewith, (shown in FIG. 2A as a set 215 of other assembly manifests).

Each assembly manifest describes the assembly and includes information about its individual assemblies, including, for example, the name and version of the assembly, the items (program files, resources) that make up the assembly, and the binding path to items within the assembly (e.g., for Win32 DLLs this is the location of the DLL relative to the root of the assembly, whereas for COM Servers this is the CLSID (class identifier), ProgID (programmatic identifier) and other COM metadata). The assembly manifest may also include any dependencies on other assemblies, object classes and global names.

A sample assembly manifest is set forth in TABLE 3 below:

TABLE 3

```
<?xml version="1.0" encoding="UTF-8" standalone="yes"?>
<assembly xmlns="urn:schemas-microsoft-com:asm.v1"
manifestVersion="1.0">
    <assemblyIdentity type="win32"
name="Microsoft.Tools.VisualCPlusPlus.Runtime-Libraries"
version="6.0.0.0" processorArchitecture="x86"
publicKeyToken="6595b64144ccf1df"/>
    <file name="mfc42u.dll"
hash="3eab067f82504bf271ed38112a4ccdf46094eb5a"
hashalg="SHA1">
        <comClass description="Font Property Page"
clsid="{0BE35200-8F91-11CE-9DE3-00AA004BB851}"/>
        <comClass description="Color Property Page"
clsid="{0BE35201-8F91-11CE-9DE3-00AA004BB851}"/>
        <comClass description="Picture Property Page"
clsid="{0BE35202-8F91-11CE-9DE3-00AA004BB851}"/>
    </file>
    <file name="mfc42.dll"
hash="ac72753e5bb20446d88a48c8f0aaae769a962338"
hashalg="SHA1"/>
    <file name="atl.dll"
hash="a7312a1f6cfb46433001e0540458de60adcd5ec5"
hashalg="SHA1">
        <comClass description="Registrar Class"
clsid="{44EC053A-400F-11D0-9DCD-00A0C90391D3}"
```

TABLE 3-continued

```
progid="ATL.Registrar"/>
        <interface iid=" {B6EA2051-048A-11D1-82B9-
00C04FB9942E}" name="IAxWinAmbientDispatch"
proxyStubClsId32="{00020424-0000-0000-C000-000000000046}"/>
        <typelib tlbid="{44EC0535-400F-11D0-9DCD-
00A0C90391D3}" version="1.0" helpdir=""/>
    </file>
    <file name="msvcrt.dll"
hash="ba62960ceb15073d2598379307aad84f3a73dfcb"
hashalg="SHA1"/>
    <file name="msvcirt.dll"
hash="84eb92153ff379c67c2727cc7f6931e011ff8121"
hashalg="SHA1"/>
    <file name="msvcp60.dll"
hash="96952787a1676e38107ab93c6a33b9bcda1c912e"
hashalg="SHA1"/>
</assembly>
```

Although the application manifest 204 lists its dependencies on assembly versions, it should be noted that technically, the application 200 is only dependent on the manifest-specified assemblies themselves, not necessarily the exact versions that are specified. Instead, the specified versions are only those tested with the application and known to work.

In accordance with one aspect of the present invention, the operating system (e.g., including an assembly loading mechanism) can bind the application to another version of a needed assembly in place of one specified in the application manifest 204. To this end, configuration information that is separate from the shared assembly may be interpreted to determine which version to bind. Note that a configuration is separate from the shared assembly or assemblies to which it refers, for example, in that it is a separable entity therefrom, normally contained as a file, that can be added to or removed from a system at a later time, and so on.

In a first alternative mode, as shown in FIG. 2A, an assembly publisher can issue a publisher configuration 220 with data 222 therein that redirects a requested assembly version (e.g., requested via the manifest or the application configuration) to one that is specified by the assembly publisher. In general, a publisher configuration file applies to a single assembly, although a single assembly may have multiple associated publisher configuration files. Note that a publisher configuration applies to any application in the system that uses the corresponding assembly.

The publisher configuration enables an assembly publisher to effectively replace one assembly version with another version, such as when a service pack is installed. As described herein, in a first alternative mode, the assembly publisher configuration is interpreted after the manifest is interpreted, and thus can change an assembly initially specified by the application author. For example, in FIG. 2A, the publisher configuration 220 may include data that redirects the binding specified in the manifest (version 1.0.0.0) to version 2.0.0.0 (shared assembly$_x$ $208_2$).

As also represented in FIG. 2A, an application configuration 216 including updated assembly version dependency data 218 may be stored in the application folder 202 to similarly override some or all of the information in the application manifest 206 and/or any modification by the publisher configuration 220. For example, as represented in FIG. 2A, the application configuration 218 may include data (e.g., an instruction) that redirects the current binding from version 2.0.0.0 to version 3.0.0.0 (the shared assembly$_x$ 208$_3$), e.g., redirect version 2.0.0.0 to version 3.0.0.0. In this manner, an application author can effectively update a manifest and/or override a publisher configuration by distributing such a configuration 216, without having to actually make changes to the application manifest 204 or have a new one reinstalled. Note that other instructions directed to other dependent assemblies may be in the same configuration, and that there may not be any relevant instruction for a given assembly.

Figure 2B:
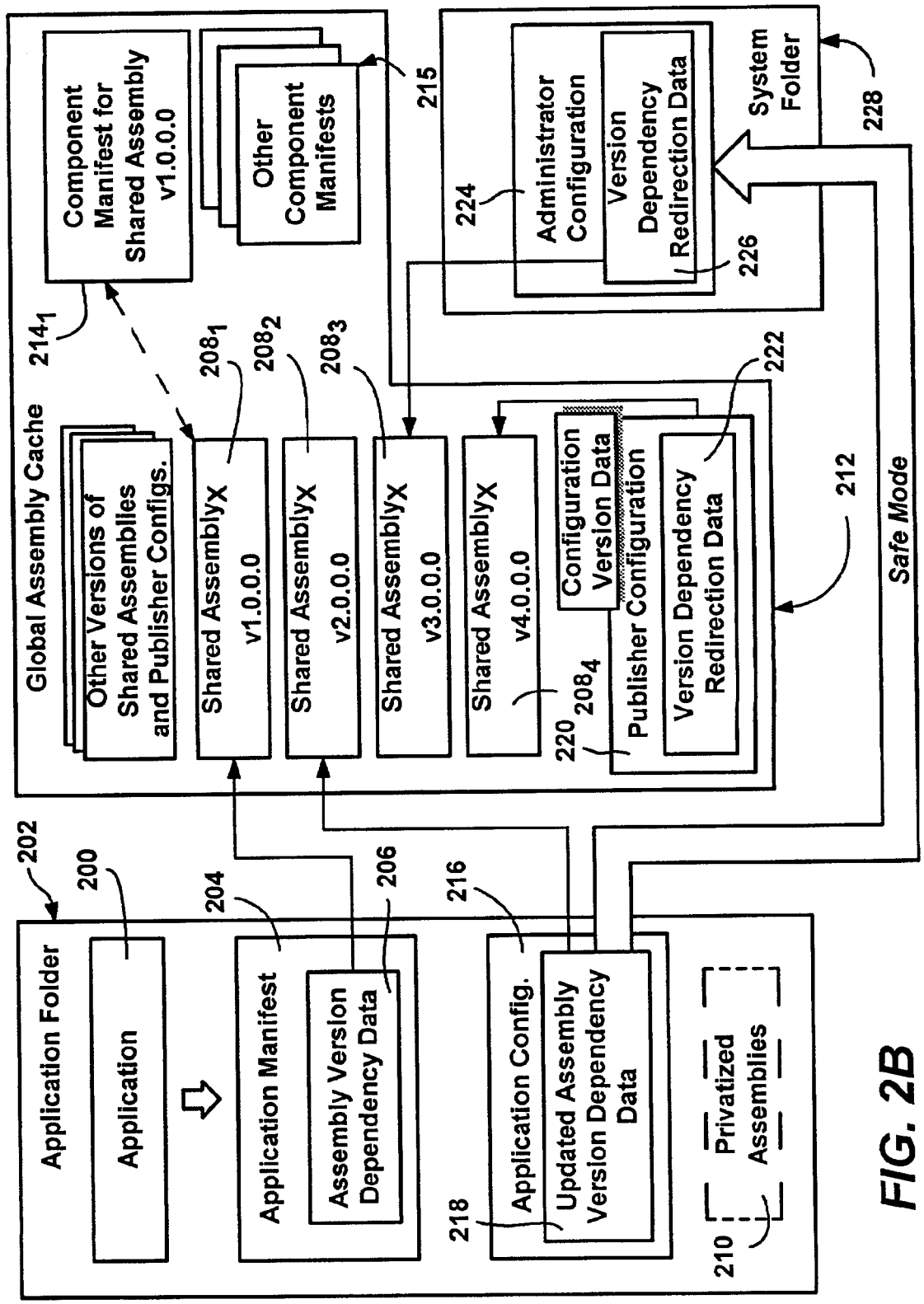

In a second alternative mode, the order of applying configurations is modified, and also at least one other configuration may be applied. More particularly, as shown in FIG. 2B, the application configuration 216 including updated assembly version dependency data 218 may be stored in the application folder 202 to override some or all of the information in the application manifest 206, and is applied before the publisher configuration is applied. For example, as represented in FIG. 2B by the arrow from block 218 to block 208$_4$, the application configuration 218 may include data (e.g., an instruction) that redirects the manifest-specified binding to version 2.0.0.0 (the shared assembly$_x$ 208$_2$), e.g., redirect version 1.0.0.0 to version 2.0.0.0. In this second alternative mode, an application author can thus similarly effectively update a manifest without actually changing the manifest.

As also represented in FIG. 2B, the assembly publisher can similarly issue a publisher configuration 220 with data 222 therein that thereafter redirects the currently requested assembly version (in the present example modified by the application configuration) to one that is specified by the assembly publisher. This mode enables assembly publishers to effectively replace selected assemblies with other versions. In this second alternative mode, because the assembly publisher configuration is interpreted after the manifest and/or any application configuration is interpreted, the publisher can thus change the assembly specified by the application author. In the example shown in FIG. 2B, the publisher configuration 220 includes data that redirects the binding to version 4.0.0.0 (shared assembly$_x$ 208$_4$), as shown in FIG. 2B via the arrow from block 222 to block 208$_3$.

Lastly, in this second mode, an administrator configuration 224 and its version data 226 may have the final decision as to which version of an assembly an application (any application on the machine) will be bound. For example, in FIG. 2B, the administrator configuration 224 is stored as a file in a system folder 228 and includes data 226 that redirects the current binding to an earlier version, version 3.0.0.0 (shared assembly$_x$ 208$_3$), as shown in FIG. 2B via the arrow from block 226 to block 208$_3$. As can be understood, the administrator configuration 224 allows an administrator or the like to bind any system applications to a new assembly, or a restore a binding to an older assembly, (e.g., version 4.0.0.0 back to version 3.0.0.0 as shown in FIG. 2B), and so on, regardless of what other configurations may specify. With the various configurations, updates to applications via new assemblies are possible, but only in a safe, controlled manner, with the machine administrator having the final determination.

Although complete compatibility of a shared assembly should be thoroughly tested, even the smallest change to a shared assembly's code may cause an incompatibility with some applications that consume them. In such an event, in the second alternative mode wherein the publisher configuration data can override the application configuration data, the application configuration file may specify that "safe mode" binding should be applied to the specified assembly. In the safe mode, the publisher configuration resolution stage is avoided, whereby the application operates with no publisher configuration overrides. To use the safe mode, the application configuration 218 (or other system setting, e.g., set by an administrator) can explicitly instruct the operating system to bypass the interpretation of the publisher configuration 220, whereby the application author (or an administrator) controls the version that is bound to the application. In FIG. 2B, this is represented by the wide arrow (labeled "Safe Mode") from block 218 to block 224. Any administrator policy still may make the final decision, however.

It should be noted that the safe mode bypasses publisher configuration in the second alternative mode, which may affect the version that is used even when the administrator configuration includes an instruction related to a version of that assembly. By way of an example, as shown in FIG. 2B, consider the application configuration specifying the safe mode. If the administrator configuration includes an instruction to change version 4.0.0.0 back to version 3.0.0.0, but no others with respect to this assembly, the change to version 3.0.0.0 will not be implemented in the safe mode because the application configuration has specified version 2.0.0.0, whereby the administrator configuration will see version 2.0.0.0 (and not see version 4.0.0.0) to change it. However, if not in the safe mode, the version will be changed to 3.0.0.0 because the publisher configuration will have first changed the version to 4.0.0.0 as described above, whereby the administrator configuration instruction for version 4.0.0.0 will apply and version 3.0.0.0 will be restored. To provide flexibility, a configuration instruction can specify a range of versions to redirect, e.g., change any version in the range from 1.2.3.4 to 5.6.7.8 to version 9.0.0.0.

Note that while two alternative modes are primarily described herein, it can be readily appreciated that other such modes are feasible. For example, it is feasible to have a third alternative mode similar to the first alternative mode described above wherein a publisher configuration is interpreted before an application configuration, but the further including an administrator configuration as in the second alternative mode. Indeed, the present invention is not limited to any particular ordering, number and types of configurations, and so on, but rather contemplates any such combinations and permutations.

As described above, binding starts with a reference, for example, that at least contains the name or other identifier of the assembly. A fully-specified assembly reference (e.g., in the manifest and/or configurations) contains the information necessary to disambiguate one assembly from another. Dependent assembly references, which are constructed at link time, are fully-specified assembly references. However, under some circumstances, it may be desirable to provide only a subset of the assembly identity information, yet still issue a bind. For example, a partially-specified assembly reference may be missing public key, and/or version fields.

Because partially-specified references are ambiguous, the binding process can employ special logic to locate and bind to these assemblies. More particularly, a first step to resolving a partial-specified assembly bind is to search for an assembly in the application directory that satisfies the specified fields in the assembly reference. The application directory is probed first, (as opposed to immediately searching for a matching assembly in the global assembly cache 212), to provide an application author/deployer with some control over the assembly that is finally retrieved through a partially specified bind request. In other words, because the global assembly cache 212 is a global install location, which can be used by all applications, searching the global assembly cache 212 first may result in an assembly being returned that was not intended by the original author/deployer.

Should the binding process be unable to locate a matching assembly in the application directory, a lookup in the global assembly cache 212 may be performed to attempt to find a matching assembly, (e.g. for strongly-named files in the first alternative mode). If a match is not found in the global assembly cache 212, the assembly bind may be failed (e.g., in the first alternative mode), or a download can be attempted (e.g., in the second alternative mode). If a matching assembly has been located, the binding process (e.g., the binding/initialization mechanism) reads the manifest data for the assembly and constructs a new, fully-specified assembly reference from this data. Because the assembly reference is now fully-specified, binding configuration can be applied on this reference, as described above, that is, the bind proceeds as if the original assembly reference was fully-specified, with the above-described logic used to specify one assembly file that, if located, satisfies the bind request.

Figure 3A:
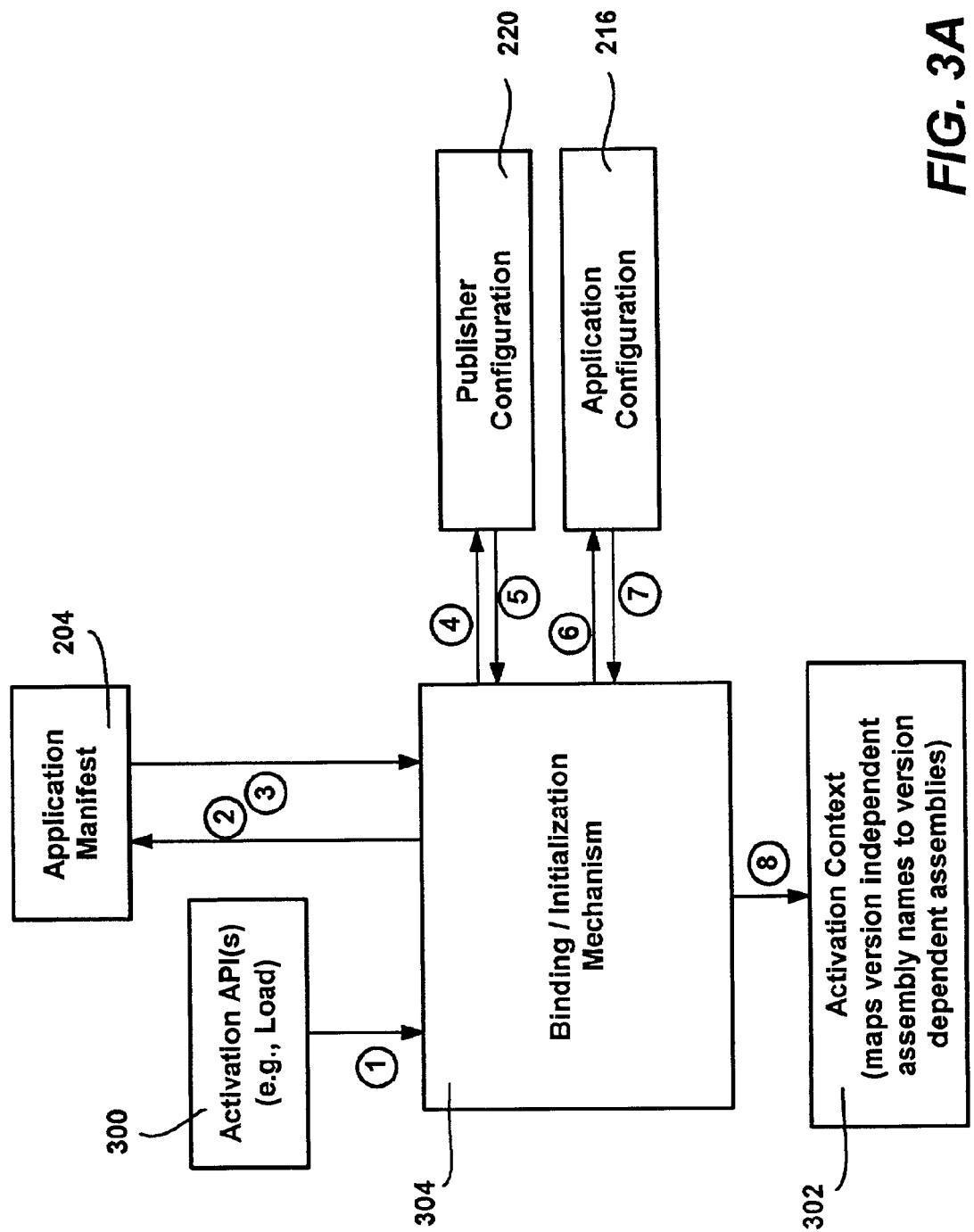
FIGS. 3A and 3B are block diagrams generally representing manifests and configurations for binding an application to a specified assembly version in alternative modes, respectively, in accordance with aspects of the present invention.

FIG. 3A generally represents the interpreting of the manifest and configurations in the first alternative mode, beginning when one (or more) of a set of activation APIs (application programming interfaces) 300 are called in response to a request to run an application program, e.g., the application program 200. It should be noted that not every assembly used by an application needs to be specified in the application manifest, nor does each assembly manifest have to specify all of its dependencies. For example, the architecture allows for binding to components, as was previously done, so a component (such component files are not usually referred to as assemblies) not specified in a manifest would expect to be found through a search path. In addition, it is feasible for the architecture to allow a default assembly version to be used when a particular version of an assembly is not specified in a manifest. When more than one version of an assembly is available, the default assembly is the most-recent version, however it is possible for an administrator or user to set (e.g., via interaction with the operating system through a dialog box, property sheet or the like) any version as a default. In this manner, a configuration does not have to concern itself with assemblies whose versions are not to be changed.

Although it is possible to dynamically interpret the manifest and/or configurations to locate the appropriate version of an assembly each time an assembly is requested, assemblies are requested frequently, and thus it is more efficient to cache the information once. To this end, the activation APIs 300 cause an activation context 302 for that program 200 to be constructed if a valid one does not already exist for the application 300, (for example, when the application is being run for the first time or the activation context 302 exists but its information is invalid). Once created, the activation context 302 is maintained in a persistable binary form for caching. In general, there is an activation context for each application that has an expressed assembly dependency, and each activation context includes one or more mapping tables preferably hashed for quick lookup. As described below, the operating system (a runtime version matching mechanism therein) uses the activation context 302 to determine where to retrieve the version.

To construct the activation context 302, the activation APIs call (or otherwise include) a binding/initialization mechanism 304, wherein the call is generally represented in FIG. 3A by the arrow accompanied by the circled numeral one (1). If a new activation context 302 needs to be constructed, the binding/initialization mechanism 304 reads and interprets the application manifest 204 as represented in FIG. 3A by the arrows labeled with circled numerals two (2) and three (3). More particularly, as described above, whenever the operating system (e.g., a binding mechanism therein, including the binding/initialization mechanism 304) is asked to perform a bind for a shared assembly, the bind client (e.g., an API called to load a DLL) is required to provide a reference, which describes the requested assembly. The version of the assembly reference may then be altered by a series of configuration resolution stages, as described herein, by which the binding mechanism decides which version of the assembly to return to the bind client. Configuration resolution allows a reference to an assembly constructed at compile/link time to be modified after the application has been deployed, without re-compilation/re-linking of the assemblies involved.

As represented in FIG. 3A, in the first alternative mode described above, the first phase in bind configuration resolution is publisher configuration, by the arrows labeled four (4) and five (5). In general, publisher configuration allows shared-assembly vendors to make compatibility statements between different revisions of their software. These per-assembly configuration files are wrapped as strongly-named (e.g., COM+) assemblies, and are installed into the global assembly cache 212 (FIG. 2A), e.g., as part of a service-pack-style update. Because publisher configuration assemblies may affect all applications on the system, these assemblies should be installed separately from application installations, otherwise an application may "break" other applications simply through installation.

In one implementation, a publisher configuration assembly has the same name as the assembly it affects, but with a further extension appended to the name, (e.g., "config"). This publisher configuration assembly has a module reference to an XML configuration file that stores the actual binding redirect information. Moreover, because assembly metadata contains a hash for the XML configuration file, it is possible to validate the integrity of the configuration file.

A publisher configuration assembly is created by authoring an XML configuration file (which may have any name), and using an assembly linker tool or the like to create the assembly. For example, as set forth below, a publisher configuration file, version 1.0.0.0, for an assembly named "test" is created, e.g., having an XML configuration file named "test.[major].[minor].config"

where major and minor vary with the version.

Publisher configuration assemblies normally will be obtained directly from the publisher as part of a service-pack style update, intended to affect all applications on the system. Because there is no direct link between the publisher configuration and the applications it affects, version redirects specified by the publisher configuration file may contain a codebase to the targeted version in the configuration file, otherwise the operating system will not necessarily be able to locate the intended files. Another option is to install the redirected version of the assembly on the machine.

Similarly, assemblies targeted by administrator configuration can either be installed into the global assembly cache 212, advertised to the user, or located through a codebase provided in the administrator configuration file.

In this first mode, the second stage of configuration resolution, after any publisher configuration is applied, comprises resolving any application configuration. As represented in FIG. 3A by circled numerals six (6) and seven (7), if an application configuration exists, the binding/initialization mechanism 304 reads and interprets the application configuration 216. To this end, before a bind to the assembly can proceed, the application configuration file (if any) is accessed, and analyzed. For example, the configuration data may be maintained as an application configuration file, and accessed via an application base ("appbase") directory (e.g., the folder 202) or other suitable directory. A name/value pair in the application context 302 specifies the name of the configuration file.

For example, in an ".exe" runtime scenario, the file is named with the same name as the executable, but with a ".config" extension appended thereto, (e.g., "appname.exe.config"). An application author and/or deployer may choose to provide such a configuration file, thereby specifying version redirects for particular assemblies. For example, a configuration file may be written by an application author to specify that references to a common shared-assembly, whether directly provided by the application, or indirectly from a dependent assembly's dependency, should use a particular version. As another example, once an application deployer is confident that the application works with a newer version of a shared assembly, the deployer can choose to change the application configuration file to automatically use the new version instead of the version set forth in the application manifest. When interpreting the configuration, if a relevant binding redirect statement is found in the application configuration file, the version of the assembly from the original reference is modified accordingly.

Whenever a binding configuration statement is made in a configuration file, it is the responsibility of the author of the configuration file to ensure that the assembly targeted by the redirect can be found. In the case of the application configuration file, the application author/deployer may choose to package the files (e.g., binaries) for the target assembly with the application, or alternatively provide information (sometimes referred to as a "codebase") in the configuration file to tell the operating system where the files can be found. Another option is to install the redirected version of the assembly on the machine. Note that for privatized assemblies, e.g., in the second alternative mode, by attempting to locate the referenced assembly by consistently looking in the application directory, an application author may simply copy newer privatized assemblies into the application directory, and know that the newer assemblies will be automatically used by the application.

Figure 3B:
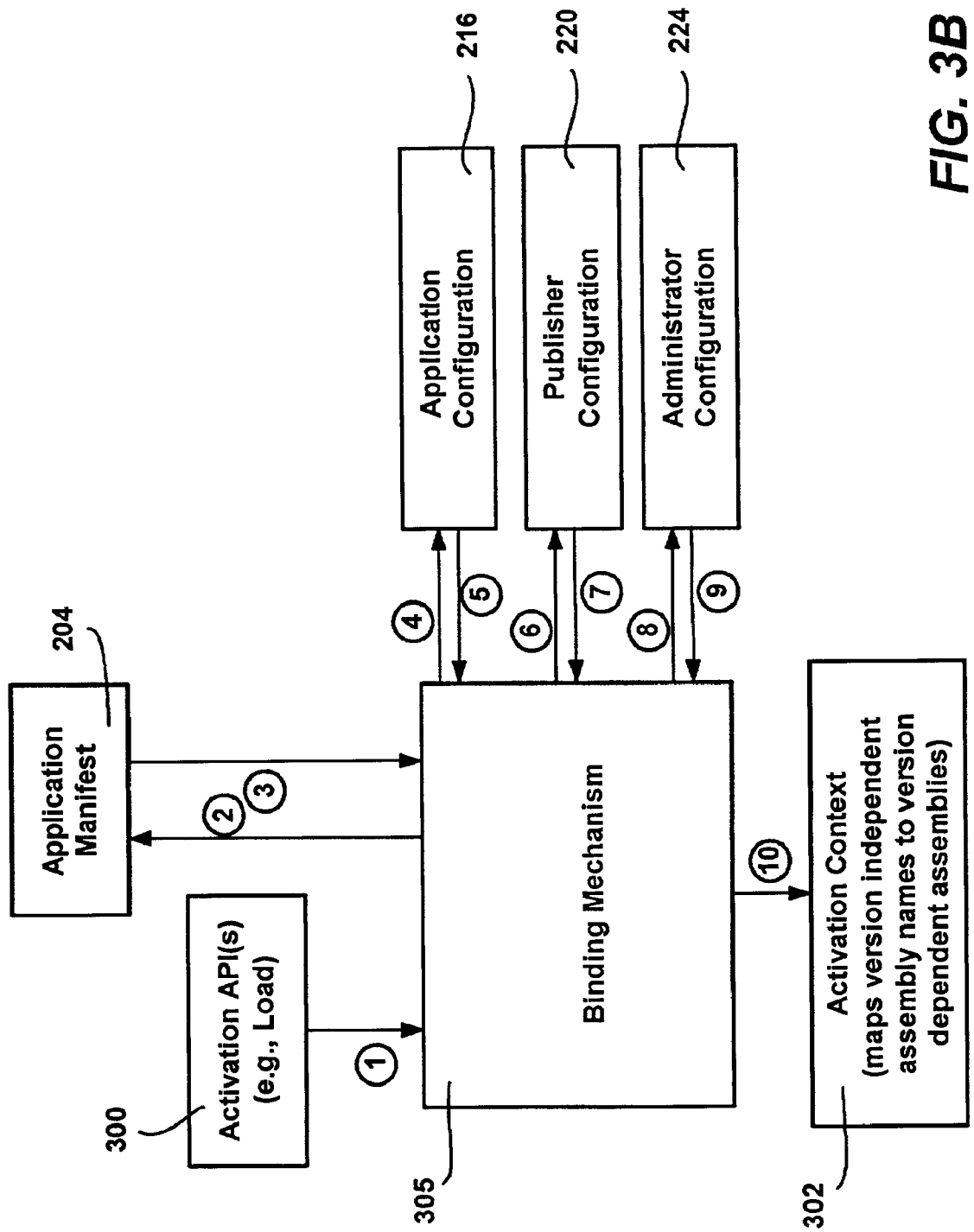

As generally described above, a second alternative mode is provided, in which the order of applying configurations is different, a safe mode is available for bypassing publisher configuration, and an administrator configuration may be present and if so is interpreted to override other configuration binding data. More particularly, in this second mode, the first stage of policy resolution comprises resolving any application policy. As represented in FIG. 3B by circled numerals four (4) and five (5), if an application policy exists, a binding mechanism 305 reads and interprets the application policy 216. To this end, before a bind to the assembly can proceed, the application policy file (if any) is accessed, and analyzed. As described above, if not bypassed via the safe mode, any publisher configuration is next applied, as generally represented in FIG. 3B by the arrows labeled six (6) and seven (7).

In this second mode, a third stage in the bind configuration resolution process is administrator configuration, represented in FIG. 3B by the arrows labeled eight (8) and nine (9). Administrator configuration is the strongest form of configuration, as it makes the final determination as to which version will be bound, and cannot be bypassed. To provide administrator configuration, the administrator configuration file 224 (FIG. 2B), e.g., named "machine.config," has the same schema as the configuration files used in the two previous stages of configuration resolution. Administrator configuration affects assembly binds that occur to any application on the system.

Once the configurations have been handled for a given assembly to which an application wants to bind, only one version of that assembly remains. This information may be cached in the activation context 302 (the arrow labeled eight (8) in FIG. 3A or ten (10) in FIG. 3B) and may be persisted (e.g., in the first alternative mode) so that it need not be computed again, unless and until a configuration change occurs. Note that in the second alternative mode, the application context is not persisted, although it is feasible to do so.

Figure 4:
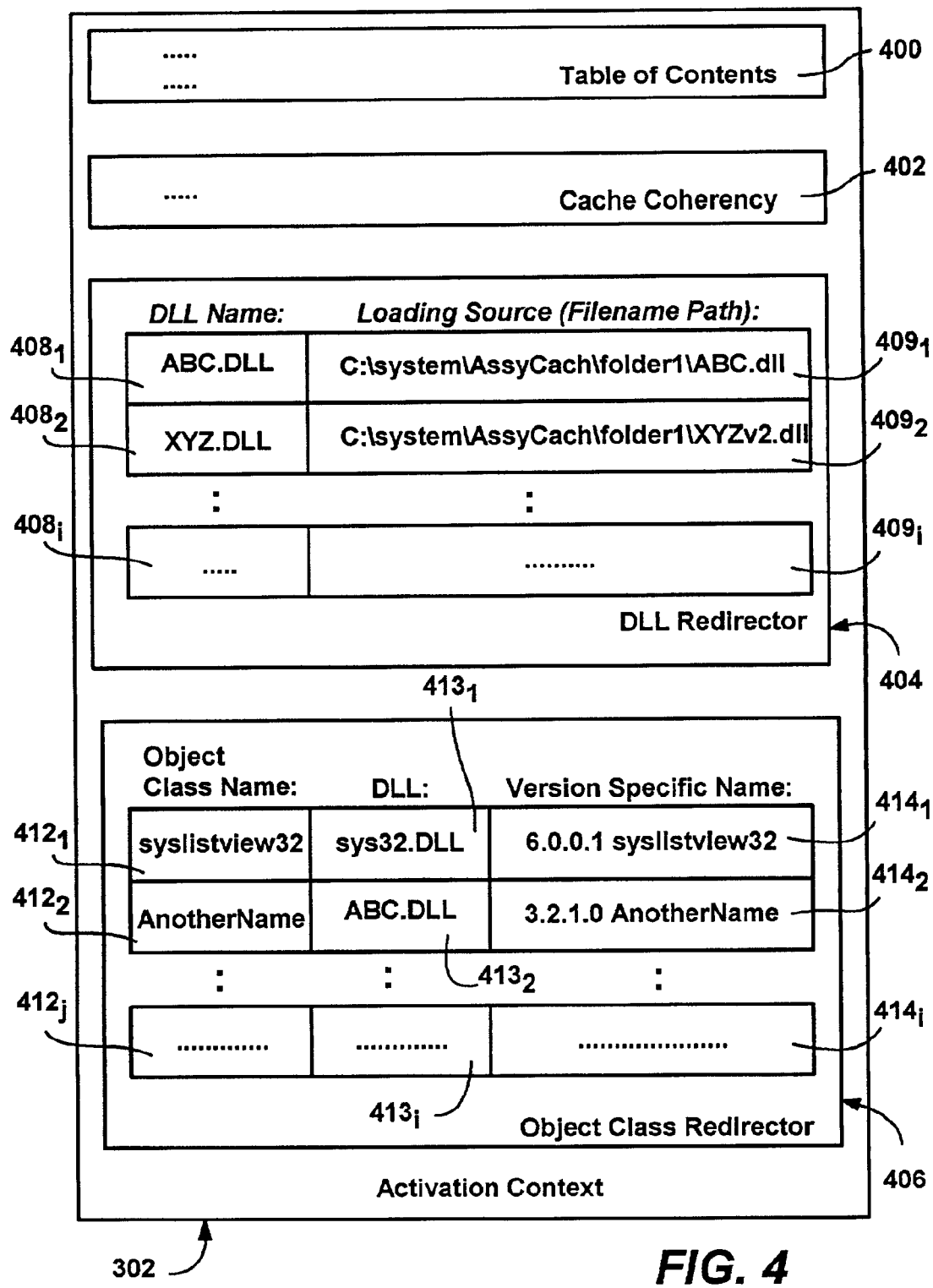
FIG. 4 is an example of information maintained within an activation context in accordance with an aspect of the present invention.

By way of example, FIG. 4 represents some of the information that may be maintained in an activation context, e.g., an activation context 302 constructed for the application $200_1$. In FIG. 4, the activation context 302 includes a table of contents 400 (e.g., providing offsets to its recordsets) for rapid access to the data therein.

For persisted activation contexts, because the configurations that may change the dependency information may change over time, (e.g., publisher configurations may be wrapped as assemblies which can be versioned, new application configurations may be downloaded and so on), in the first alternative mode the activation context 302 includes a cache coherency section 402. The cache coherency section is used to detect whether a saved activation context 302 is valid, wherein when the activation context 302 is not coherent with current configuration, it is recomputed. A section per API that implements version-specific binding is maintained.

To map the application's requests to the proper assembly versions, the activation context 302 includes a DLL redirector section 404 and an object class redirector section 406. The DLL redirector section 404 includes a record or the like for each DLL dependency that includes fields (e.g., 408, and $409_1$) that relate the DLL name used by an application to the exact pathname of the version determined following the above-described configuration-resolution process. The object class redirector section 406 includes a record or the like for each object class (e.g., Windows® object class) on which an application depends, wherein each record includes fields (e.g., $412_1$, $413_1$, and $414_1$) that relate the object class name used by an application to the DLL file it is in and a version specific name. Note that the fields are arranged in a manner that optimizes lookup, e.g., the application-provided request data corresponds to the search key, and the records may be arranged in any way (e.g., alphabetically, by frequency, linearly, binary or so on) to speed searches.

Via the activation context, during runtime as described below, an application's requests for assemblies can be efficiently satisfied with the correct version of that assembly. If a given assembly is not found in the activation context data, the default assembly is used. To summarize, when an application first runs, the activation context built from the manifest data is cached, whereby the global, version-independent named objects requested by an application are mapped to version-dependent named objects as specified in the manifest and redirected by any configurations. As the application executes and requests a named object via one of the activation APIs, the version-independent named objects are applied in a version-specific fashion by accessing the application context, whereby the application gets the correct version.

Figure 5:
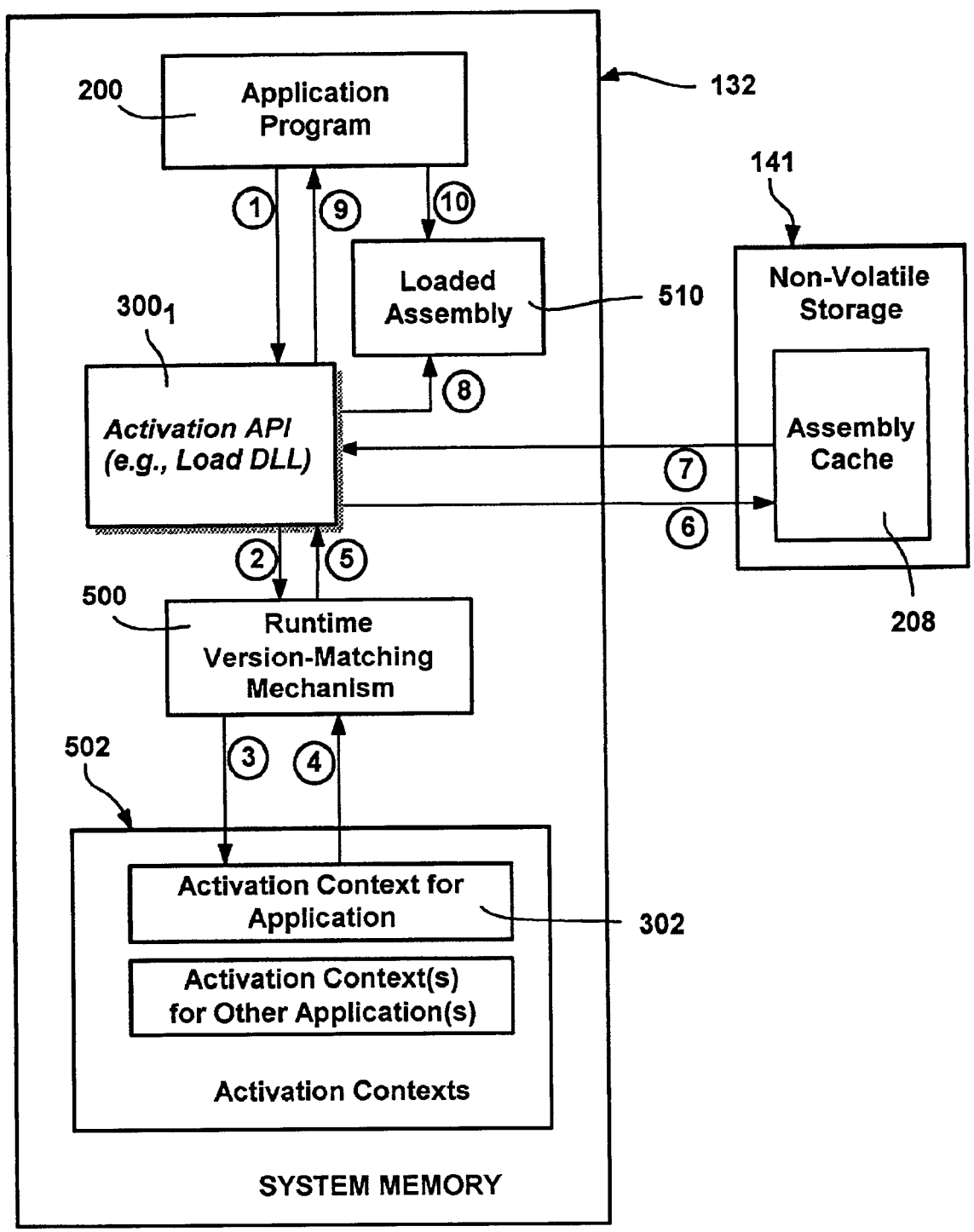
FIG. 5 is a block diagram generally representing various assemblies for utilizing an activation context at runtime to locate and load a particular version of a requested assembly version in accordance with an aspect of the present invention.

FIG. 5 represents the general operation during runtime, e.g., in the first alternative mode, wherein an application 200 requests via one of a set of application APIs (e.g., $300_1$) a version-independent assembly (represented via the arrow labeled with circled numeral one (1)). Application APIS include those directed to loading DLLs, COM server loading, COM interface proxy stub metadata, type libraries for COM, program identifiers for COM, object (e.g., Windows®) classes, kernel global objects (e.g., semaphores, mutexes, events, shared memory, COM categories), application settings and database (registry) connections.

When the application API $300_1$ receive the request, the request data (e.g., the application provided name) is passed to a runtime version-matching mechanism 500 (the arrow labeled two (2)). The runtime version-matching mechanism 500 locates the correct activation context 302 (from among a store 502 or the like of those maintained) for the calling application 200, and accesses the records therein to determine the correct version of the requested assembly (the arrows labeled three (3) and four (4)). Via the tables in the activation context 302, the runtime version-matching mechanism 500 will either return (e.g., as a return parameter, with the arrow labeled five (5)) the path and filename of the version-specific assembly, or a not-found status or the like (and/or the path and filename of the default file) to the activation API that called it, in which case the activation API will load the default assembly. As represented in FIG. 5 by the arrows labeled six (6) through eight (8), the activation API $300_1$ accesses the assembly cache 212 to load the correct version of the assembly. Note that alternatively, the runtime version-matching mechanism 500 may access the assembly cache 212 on behalf of the calling API $300_1$ to obtain and/or load the correct version, which is either the one listed in the records or the default version if none was found. Further, note that privatized assemblies may be loaded from the application directory. In any event, the correct assembly version 510 is loaded and the activation API $300_1$ returns from the call to the application 200, (the arrow labeled nine (9)), and the application can use the loaded assembly 510 (the arrow labeled ten (10)).

Figure 6:
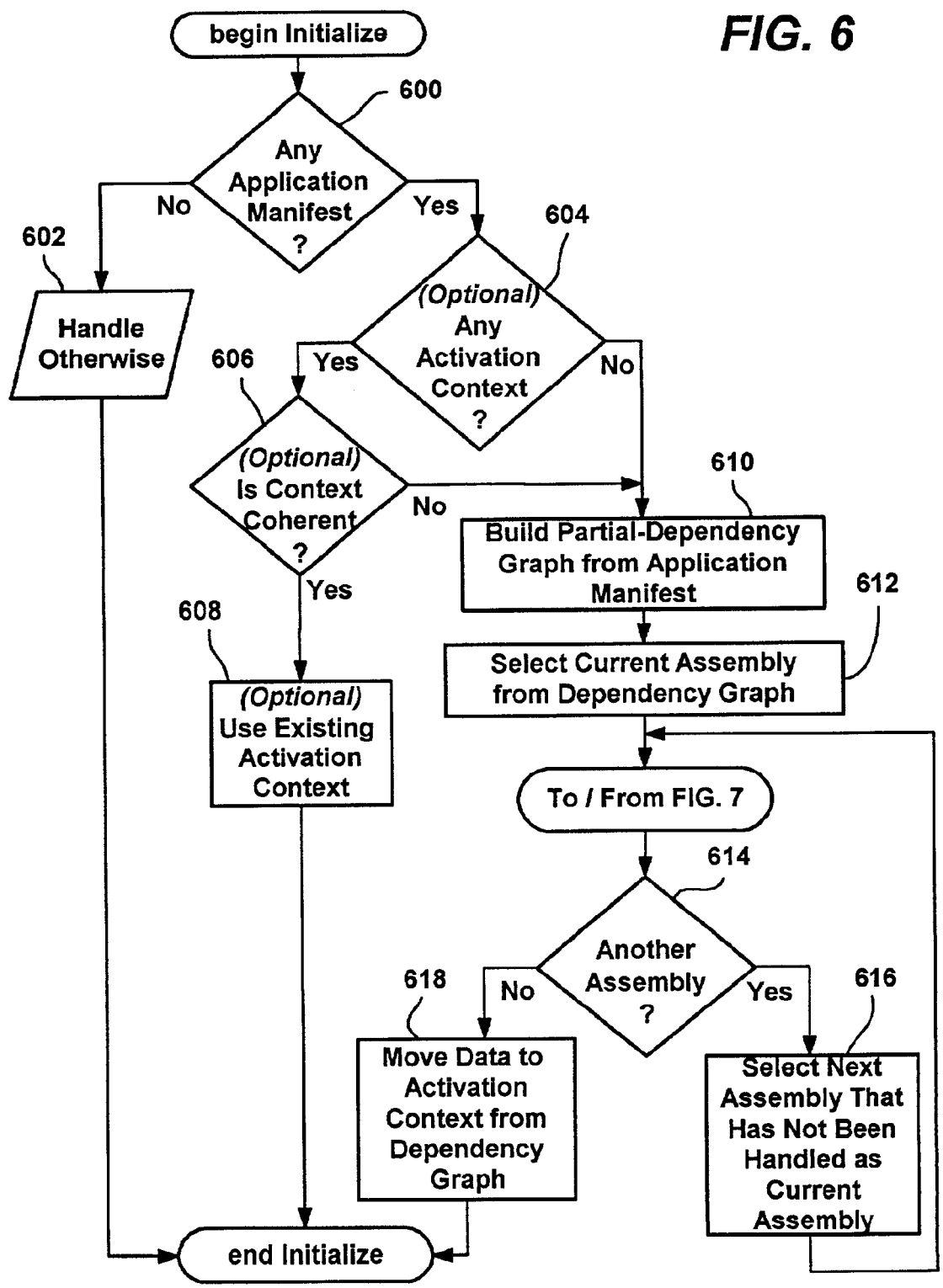
FIGS. 6–7 comprise a flow diagram representing general steps taken to initialize an activation context in a first alternative mode based on manifests and configurations in accordance with an aspect of the present invention.
Figure 7:
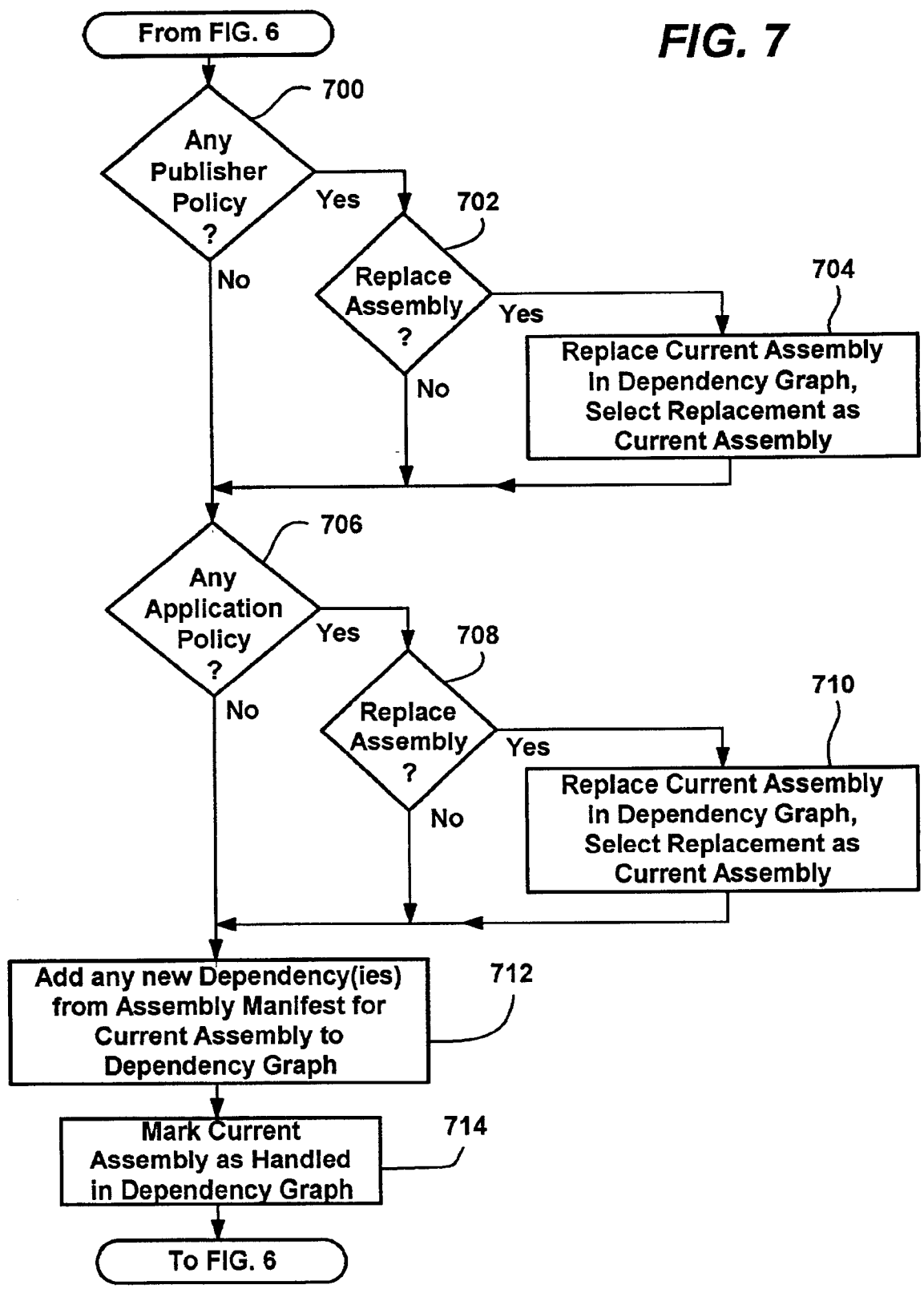
Figure 9:
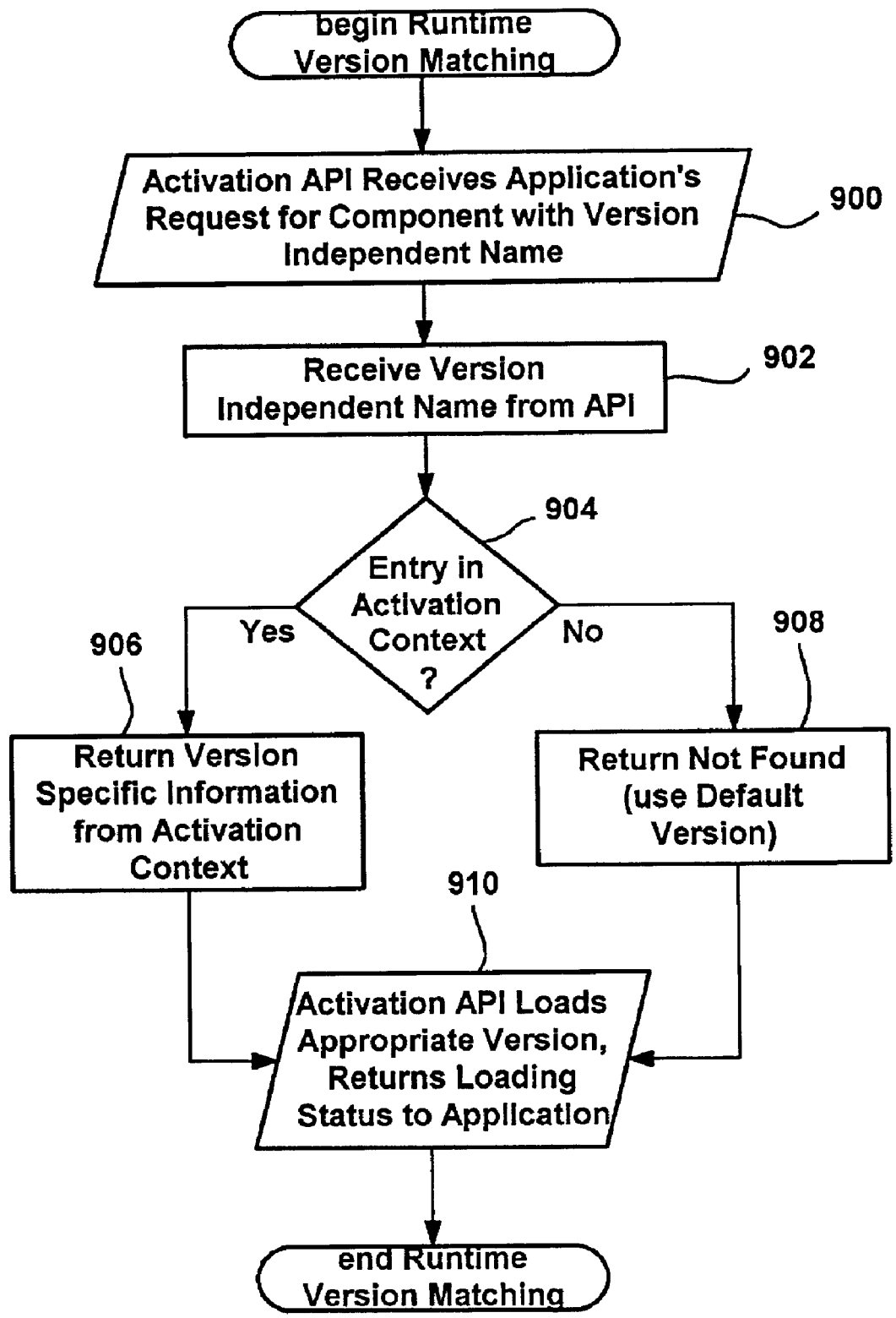
FIG. 9 is a flow diagram representing general steps taken to utilize an activation context during runtime in accordance with an aspect of the present invention.

Turning to an explanation of the operation of the present invention with particular reference to the flow diagrams of FIGS. 6–7 and 9, as described above, the mapping of an application to a specified version of an assembly or other data structures essentially comprises two phases, an initialization phase in the first alternative mode (FIGS. 6–7) and a runtime phase (FIG. 9). In general, the initialization phase constructs the activation context, if needed, that maps version-independent assemblies to version-specific assemblies based on the dependencies and other instructions provided in the various manifests and configurations. Then, during a runtime phase, (FIG. 9), the activation context is accessed as needed to rapidly locate and load the appropriate versions when an application requests an assembly to which it needs to be bound.

FIGS. 6–7 represent example steps that may be taken in the first alternative mode during the initialization (pre-application execution) phase to construct the activation context, if needed. When creating a new process, the binding/initialization mechanism 304 (e.g., of the operating system) checks for an application manifest in same file system directory as the calling executable, as represented in FIG. 6 by step 600. If an application manifest does not exist, the binding/initialization mechanism 304 handles its absence in another manner, (step 602), e.g., the operating system may search for it, download it, and/or essentially give the application default versions during runtime, such as by first loading any requested assembly from the application's own directory when one is present, and otherwise using the default assemblies from the assembly cache.

When step 600 determines that an application manifest exists, the binding/initialization mechanism 304 (FIG. 3) preferably branches to step 610 to create the activation tables. Alternatively, if activation contexts may be preserved rather than recomputed each runtime, the binding/initialization mechanism 304 may check for an existing activation context (e.g., 302) for the application. If an existing activation context is found, step 604 branches to step 606 to validate it, otherwise step 604 branches to step 610. Step 606 checks the activation context to determine if it is coherent with current configuration, and if so, the existing activation context 302 can be used (step 608) and the initialization process ends. If alternatively the activation context 302 is not coherent with current configuration at step 606, for example, because a more recent configuration has been provided to the system, the initialization process continues to step 610 to recompute a new activation context 302.

In the event that the initialization process continues to step 610 to create the activation context, step 610 represents obtaining the binding information from the application manifest. Steps 610, 612, 614 and 616 of FIG. 6 are executed, along with the steps of FIG. 7, essentially to walk through the application manifest, configurations and any assembly manifests in order to build up a dependency graph, including replacing assembly information (e.g., maintained as nodes in the graph) according to configurations in the dependency graph and adding any new nodes to include the dependencies of any assembly manifests.

By way of example, FIG. 7 operates once the application manifest has it dependent assemblies added to the dependency graph (step 610 of FIG. 6) and a requested assembly version (node) therein has been selected (step 612, e.g., via a top-down, left-to-right or other suitable progression) for processing.

Figure 8:
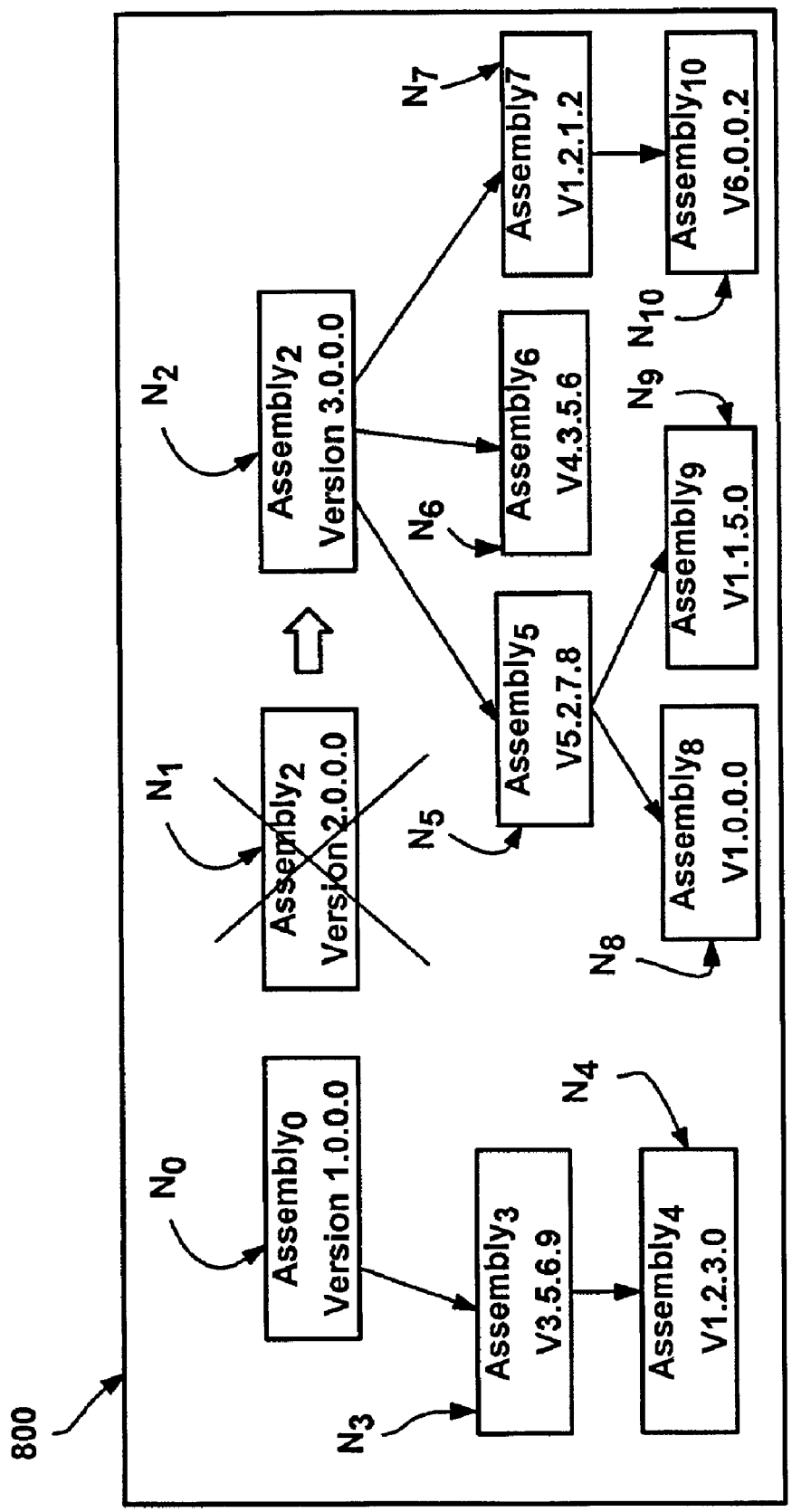
FIG. 8 is a representation of a dependency graph useful in constructing the activation context in accordance with an aspect of the present invention.

At step 700, a test is performed to determine whether the assembly has a publisher configuration associated therewith, e.g., in the global assembly cache. If not, step 700 branches ahead to test for an application configuration at step 706, described below. If a publisher configuration is found at step 700, step 700 branches to step 702 wherein the publisher configuration is interpreted to determine whether there is an instruction therein for replacing the assembly version that is currently under evaluation, i.e., the one currently selected in the dependency graph either as originally specified in the manifest. If a replacement instruction is found, step 702 branches to step 704 wherein a dependency graph is altered to reflect the replacement, otherwise step 702 effectively bypasses step 704. By way of example, FIG. 8 shows a dependency graph 800 in which a node representing an assembly, such as the node N1, has been replaced by a node N2. Note that a list or other data structure may be used instead of a dependency graph.

At step 706, a test is performed to determine whether the application has an application configuration associated therewith, e.g., in the application directory. If an application configuration is found at step 706, step 706 branches to step 708 wherein the application configuration is interpreted to determine whether there is an instruction therein for replacing the assembly version that is currently under evaluation, i.e., currently selected in the dependency graph by identification in the manifest or as overridden by the publisher policy. If such a relevant replacement instruction is found, step 708 branches to step 710 wherein the dependency graph is altered to reflect the replacement.

At this time, the appropriate assembly version is known, as specified in the manifest and as altered via any configuration instructions, as described above. Step 712 enumerates any dependencies in the assembly manifest that corresponds to this appropriate assembly, e.g., to add dependent nodes to the dependency graph. Note that if an assembly representation (node) is already in the graph for a given assembly, a pointer from the node may be added to show the dependency rather than place a new node in the dependency graph. Step 714 marks the current node representing the assembly as having been handled, and the process returns to step 614 of FIG. 6 to select (step 614) and evaluate any other nodes in the graph that have not yet been handled, until none remain. Once the dependency graph is complete at step 614, the data in the dependency graph is used to construct the activation context 302, e.g., essentially by filling in the tables' fields with the correct version information for each assembly present in the graph. When constructed, the activation context is copied to the child process in the operating system data structure's defined environment process, making it the process default.

Note that to avoid problems, each configuration resolution stage is only evaluated once. For example, if a subsequent version redirect occurs as a result of any later configuration resolutions, the previous stages are not re-consulted to re-apply configuration. Re-applying configuration after other forms of configuration are applied may result in circular/infinite configuration redirects, and add unnecessary complexity to the binding process. Notwithstanding, in an alternative implementation, the process may, for example, loop back to handle a situation in which a replacement assembly may have another configuration associated therewith that can cause replacement of the currently selected assembly, and so on. Note that other safeguards against an infinite loop may be implemented to prevent a situation wherein versions have circular dependencies.

FIG. 9 shows the general steps taken to locate and load the correct version at runtime, e.g., when a program at runtime creates a global object, the system automatically gives it a version-specific named object by consulting the activation context 302 built from the manifest as altered by any configurations. Note that FIG. 9 is intentionally streamlined for efficiency, i.e., the activation context is built in advance, so that during runtime an efficient and rapid lookup can be performed to find the appropriate version.

Beginning at step 900 the activation API receives the application request including the version-independent assembly name, not the version specific name, and passes it as a parameter or the like to the runtime version matching mechanism, where it is received at step 902. If an entry for the name is in the activation context at step 904, the runtime version matching mechanism returns the version specific information (e.g., including the path and filename of the correct version) based on the manifest at step 906. If an entry for the name is not found in the activation context at step 904, at step 908 the runtime version matching mechanism returns a not found status, (or alternatively can determine and return the path and filename of the default version). At step 910, the activation API loads the appropriate version, and returns a loading status or the like. The operating system also maps any uses of this named object to the appropriate version to allow for multiple versions of the code module to run simultaneously without interfering with each other, whereby, for example COM object data is isolated per object. At this time, the correct version as specified in the manifests is loaded, even though the application's executable code did not specify any version. Indeed, by providing an associated manifest that can be stored into the application's directory, an already existing application (e.g., written and installed before the present invention) can benefit from the present invention. In this manner, the application runs with a controlled set of assemblies bound thereto.

Figure 10:
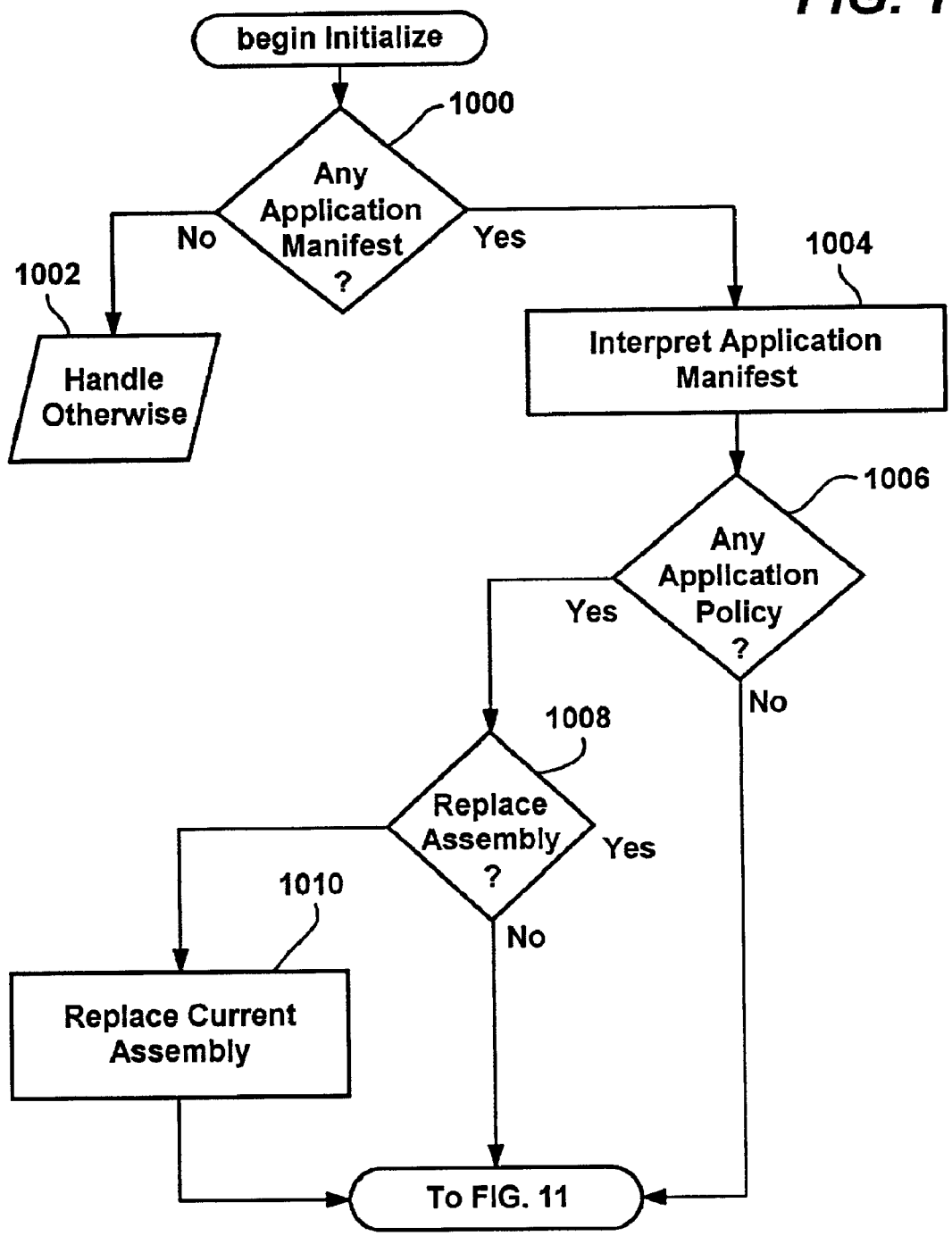
FIGS. 10–12 comprise a flow diagram representing general steps taken to determine assembly versions in a second alternative mode based on manifests and configurations in accordance with an aspect of the present invention.
Figure 11:
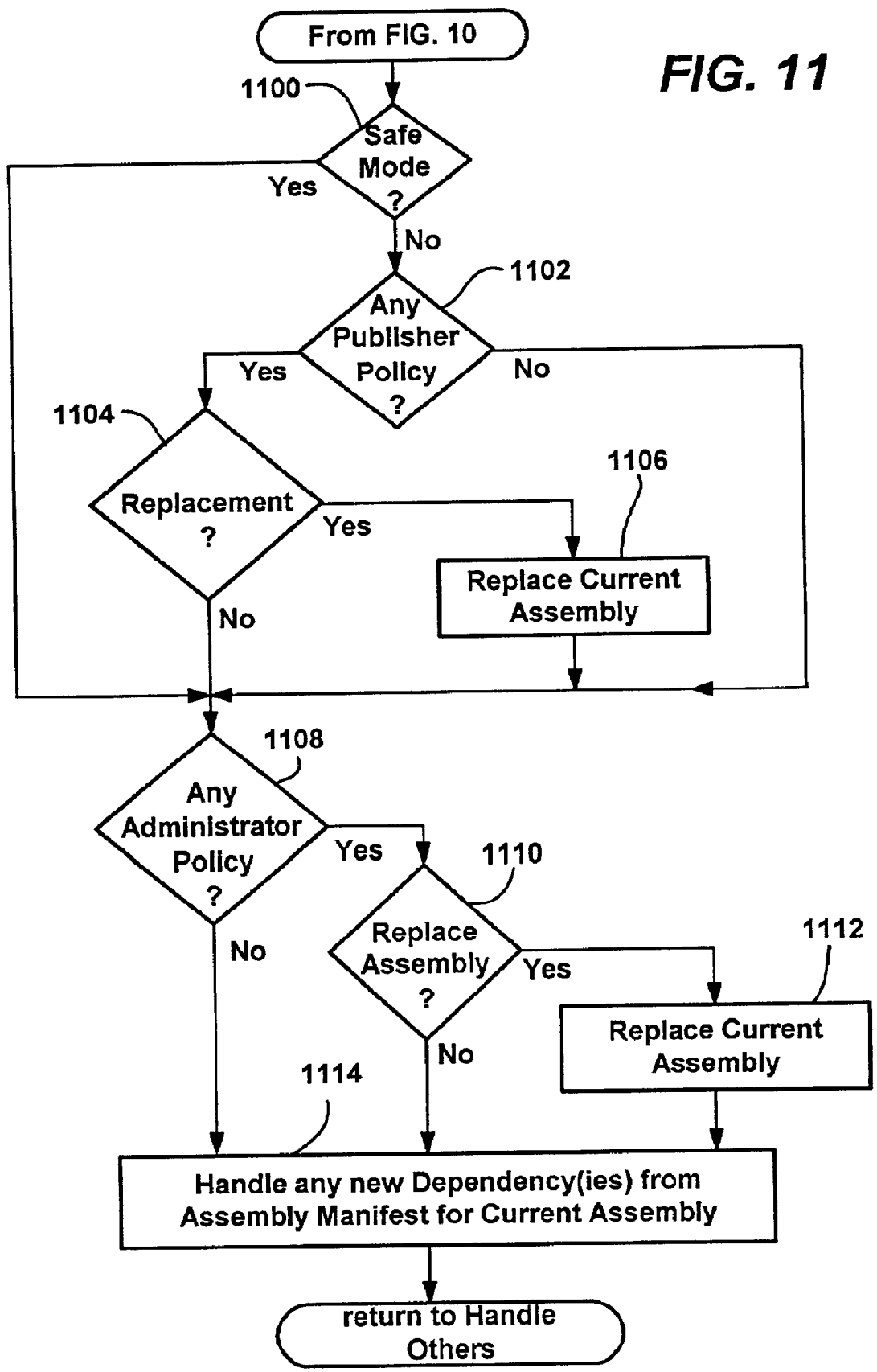
Figure 12:
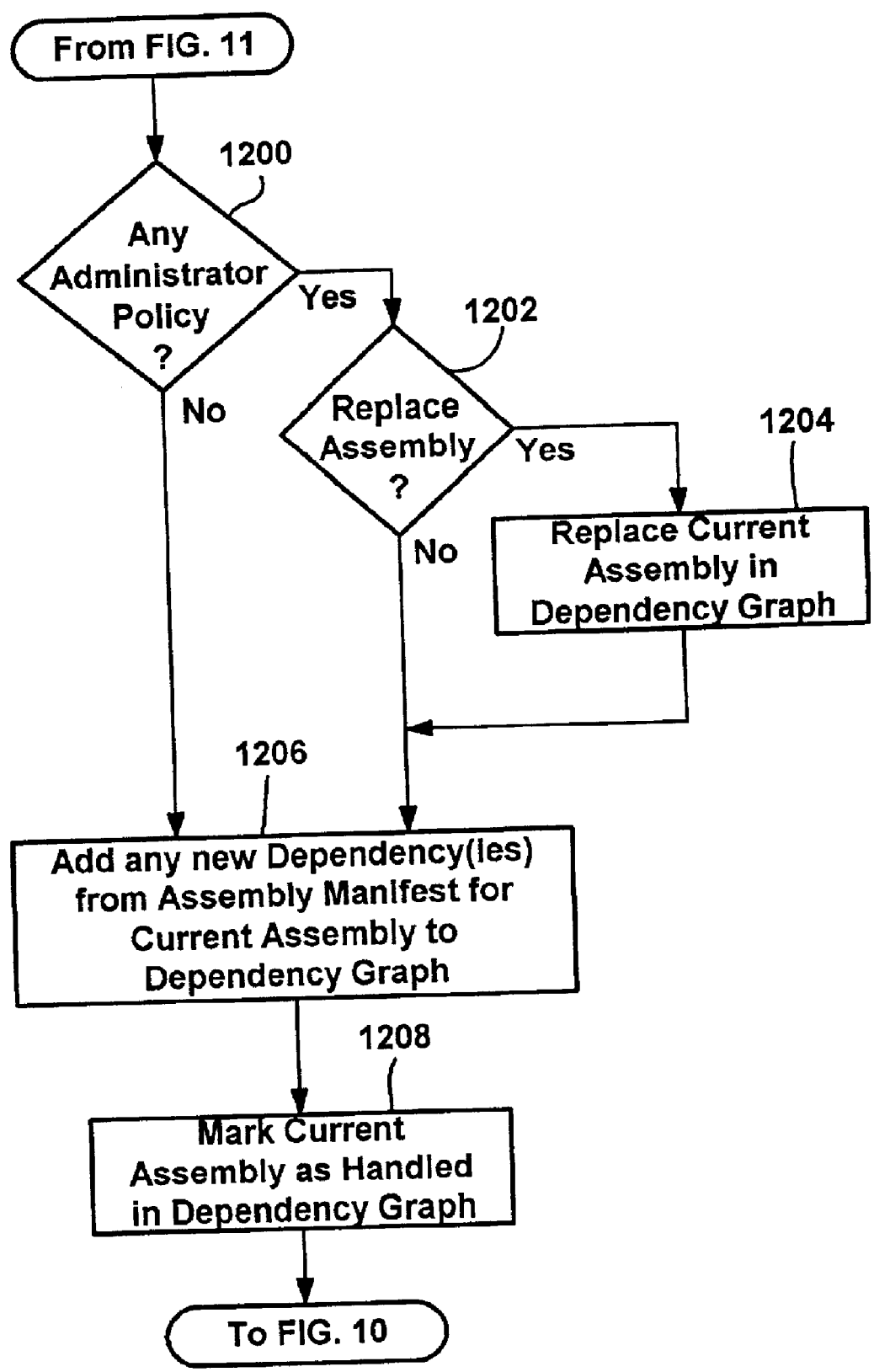

Turning to the second alternative mode, FIGS. 10–11 represent example steps that may be taken, such as dynamically during runtime, to determine which version of an assembly to bind. To this end, the binding mechanism 305 of FIG. 3B (e.g., of the operating system) may check for an application manifest in same file system directory as the calling executable, as represented in FIG. 10 by step 1000. If an application manifest does not exist, the binding mechanism 305 handles its absence in another manner, (step 1002), e.g., the operating system essentially will give the application default versions during runtime, such as by first loading any requested component or assembly from the application's own directory when one is present, and otherwise using the default assemblies from the assembly cache.

When step 1000 determines that an application manifest exists, it is interpreted as represented by step 1004. Then, in this second mode, step 1006 tests whether an application configuration exists for this application, e.g., in the application directory. If not, step 1006 branches ahead to FIG. 11 to test for whether a publisher configuration applies, as described below. If an application configuration is found at step 1006, step 1006 branches to step 1008 wherein the application configuration is interpreted to determine whether there is an instruction therein for replacing the assembly version that is currently under evaluation. If such a relevant replacement instruction is found, step 1008 branches to step 1010 wherein the current assembly binding information is replaced.

FIG. 11 represents the next steps in this second alternative mode, wherein if an application configuration exists, step 1100 tests whether it includes data specifying the safe mode of configuration resolution. If the safe mode is specified, step 1100 avoids the publisher configuration evaluation by branching ahead to test for administrator configuration, described below with respect to steps 1108, 1110 and 1112. Note that although not specifically shown in FIGS. 10 and 11, step 1006 (FIG. 10) can branch to step 1102 (FIG. 11) when no application policy exists, unless something other than the application configuration (e.g., an administrative setting) is capable of setting the safe mode.

If the safe mode is not specified at step 1100, step 1100 branches to step 1102 to test for a publisher configuration. If a publisher configuration is found at step 1102, step 1102 branches to step 1104 wherein the publisher configuration is interpreted to determine whether there is an instruction therein for replacing the assembly version that is currently under evaluation, either as originally specified in the manifest or as replaced by application configuration (as described above with respect to step 1010). If a replacement instruction is found at step 1104, step 1104 branches to step 1106 wherein the replacement is made, otherwise step 1104 effectively bypasses step 1106.

The process continues to step 1108, which represents the start of the second mode's third phase of the configuration resolution process, wherein a test is performed to determine whether the system has an administrator configuration, e.g., in the system directory. If not, step 1114 is executed, as described below. If so, step 1108 branches to step 1110 wherein the administrator configuration is interpreted to determine whether there is an instruction therein for replacing the current assembly version with another version. If a replacement instruction is found, step 1110 branches to step 1112 wherein the replacement is made, otherwise there is nothing to replace and step 1110 bypasses any replacement. In any event, the process continues to step 1114.

At this time, the appropriate assembly version is known, as specified in the manifest and as altered via any configuration instructions, as described above. Step 1114 enumerates any dependencies in the assembly manifest that corresponds to this appropriate assembly for handling in a similar manner. These and other identified assemblies may be handled in a similar manner so that the correct versions as specified in the configurations are bound to the application.

As can be seen from the foregoing detailed description, there is provided a method, system and infrastructure to version globally named objects in the system. Application authors may create safe, isolated applications by simply creating a declarative manifest that describes dependencies on these shared objects, without needing to be concerned with coding the application to adjust to the version of the assembly being used. By the present invention, assemblies can be safely shared and applications can be more completely isolated.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method, comprising:

receiving a request corresponding to binding at least one shared assembly to an application program;

interpreting configuration information corresponding to the at least one shared assembly to determine a version of a shared assembly to bind to the application program, wherein the configuration information is separate from the shared assembly and wherein the configuration information comprises an application configuration, a publisher configuration and an administrator configuration; and in interpreting the configuration information, determining whether a safe mode of operation is present, and if so, interpreting the application configuration and the administrator configuration but not interpreting the publisher configuration.

2. The computer-implemented method of claim 1 wherein interpreting configuration information includes redirecting one assembly version to another assembly version.

3. The computer-implemented method of claim 1 further comprising, associating the application program with an application configuration having redirection information therein.

4. The computer-implemented method of claim 3 wherein associating the application configuration with the application program comprises storing the application configuration in a folder containing the application program.

5. The computer-implemented method of claim 3 wherein interpreting configuration information includes redirecting an assembly version from the other assembly version to a third assembly version according to at least one other configuration.

6. The computer-implemented method of claim 1 further comprising, storing the administrator configuration in a system folder.

7. The computer-implemented method of claim 1 further comprising, caching data identifying the version of the shared assembly determined from interpreting the configuration information.

8. The computer-implemented method of claim 1 wherein the application configuration, the publisher configuration and the administrator configuration, each comprises redirection information therein for redirecting one assembly version to another assembly version.

9. A computer-readable medium having computer-executable instructions for performing the method of claim 1.

* * * * *